July 8, 1941. T. A. KENNY 2,248,504
MEANS FOR INDICATING SPEED RATIOS AND POTENTIAL RATIOS
Filed Nov. 23, 1938
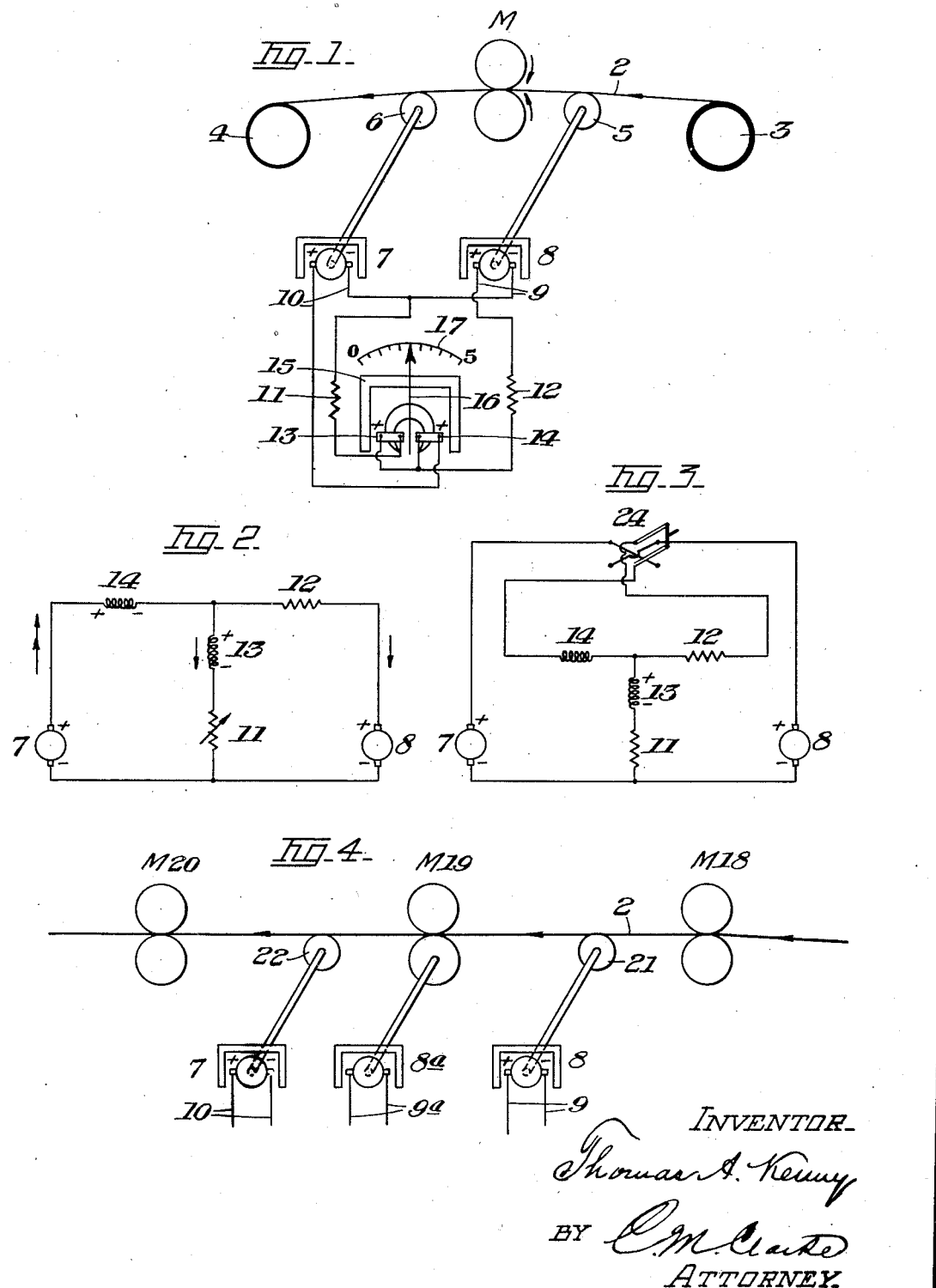

Patented July 8, 1941

2,248,504

UNITED STATES PATENT OFFICE 2,248,504

MEANS FOR INDICATING SPEED RATIOS AND POTENTIAL RATIOS

Thomas A. Kenny, Mount Lebanon, Pa., assignor of one-half to Raymond A. Siedle, Pittsburgh, Pa.

Application November 23, 1938, Serial No. 241,983

2 Claims. (Cl. 235—103.5)

This invention consists of means for indicating very slight differences in potential between a plurality of voltage producing sources by distributing the flow of current through the paths of a network circuit including a ratio meter, for such indication. Generally stated, as in the particular use herein illustrated, I utilize two or more electric tachometer generators, so coupled to the sources of differences to be determined, whereby the ratio meter in the circuit network effects indication of the proportions between generated voltage and such differences, if any. That is to say, by passing the generated potentials through such suitably designed network the current flow through the two coils of the ratio meter is so proportioned that the combined elements with the ratio meter is very much more sensitive than with a directly coupled meter. The important advantage is in effecting a very wide pointer deflection from a comparatively slight change in the ratio of the applied potentials.

While variously different applications and uses of the invention may be made in various arts and operations, one important field of use is in the art of reducing metal by cold rolling mills, and for illustration such application is presented herein as a good example of several possible applications.

It is a recognized fact in the art of cold rolling strip or sheet material that reduction in gauge is directly proportioned to the increase in speed of the stock as it is discharged from the mill, over the entering speed.

It may be stated also that somewhat similar methods have been heretofore patented and used for indicating speed ratios in rolling mill practice, but such have not proved satisfactory from the standpoints of accuracy and sensibility when applied to ratios close to unity.

On the contrary my improved method and means effecting its success increases the scale spread of the indicating instrument, as a ratio meter. Such wide scale spread, in fact full scale pointer travel, is obtained when used as illustrated on ratios very close to unity, such as 1:1.03; 1:1.05 etc.

Such ratios, closely approximate to unity, may be accomplished and determined over a wide range of speeds without noticeable or material sacrifice in accuracy.

To explain further, the preferred type ratio meter is one using a permanent magnet and moving coils, the current being conducted into and out of the coils by filaments exerting practically no torque. The permanent magnet contributes excellent flux control and inherently makes possible a very sensitive instrument. Since the ratio of currents in the two coils is the only factor influencing their position and hence that of the pointer, the filament torque being negligible, the source voltages may vary widely, so long as they do so proportionally, without change in the pointer deflection. It should be understood however that the network connection as described may also be used to advantage with a dynamometer type ratio meter.

In steel mill application my invention presents one of its most useful applications in continuously indicating the "percent reduction" of cold strip and sheet as it passes through finishing stands, such as temper or skin pass mills, as they are known.

In the cold reduction of sheet and strip steel, as stated, the reduction obtained is directly proportional to the rate of elongation of the metal, i. e. the differential between delivery and entry speeds.

Likewise it is directly proportional to the increase in speed of the delivered material to that of the entering material.

My invention, in common with some of those prior to it, prefers to use electric generators suitably coupled to rolls mounted on either side of the mill so arranged as to be rotated at speeds proportional to the entry and delivery speeds of the strip in passing.

Here however the similarity ends, for instead of connecting the generators directly to a set of instruments, or to a single ratio meter, they are connected into a suitably designed network such that both coils of the ratio meter are at all times energized by the output of one of the generators only, the output of the other generator simply being in parallel with one of the ratio meter coils and merely permitting more or less of the energy from the other generator to pass through the shunted coil, but never itself passing any current of its own through either of the ratio meter coils.

Such network makes it possible to take a ratio meter having identical or very nearly matched coils, arranged to provide full scale deflection when one of the coils carries say 50% more current than the other, in other words one which provides full scale deflection on a ratio of 1:1.5, and so proportions the current flow through it such that a 3% or a 5% change in voltage outside the network will be reflected into a 50% change in the current flow in the ratio meter coils, thus providing full scale pointer travel with external voltage ratios near unity.

Likewise, such network possesses the ability of providing means, by simply changing the value of one resistor for changing the full scale range of the meter. That is to say, if the network is adjusted to cover a 5% range it can be changed to 7%, 9%, or any other range, merely by changing the value of one resistor.

In such particular application, as illustrated in the drawing:

Fig. 1 is a schematic diagram of an embodiment of the invention as applied to a strip mill, such as a temper pass mill;

Fig. 2 is a schematic wiring diagram of the electrical connections of Fig. 1;

Fig. 3 is a similar diagram embodying a reversing switch, either manual or automatic, to permit reversible operation of the network, in the case of a reversing mill;

Fig. 4 is a view like Fig. 1 showing application to a tandem mill in which reduction of the blank is produced by the draft of the rolls and by tension applied by the faster rolls with resulting elongation.

Referring now to such application, as in Fig. 1, it shows the working rolls M of any type mill, as for cold rolling of a length of sheet or strip metal 2. The entry and delivery reels 3 and 4 respectively feed and absorb the strip 2.

The strip in its passage is in operative frictional contact with standard resiliently mounted deflector, tension or "billy" rolls 5 and 6, subject to rotation by the frictional passage of the strip over them. Geared or otherwise coupled to rolls 5 and 6 by suitable means, are a pair of electric generators 7 and 8, preferably of the magneto type which have straight line speed-voltage characteristic curves. The output from the armatures of such generators is transferred by means of conductors 9 and 10 through network resistors 11 and 12 to ratio meter coils 13 and 14 of magnet 15, for actuation of pointer 16 with relation to scale 17.

It will be understood that Fig. 1 is merely a schematic representation of the several elements and necessary connections.

In passing the strip through the mill M in the direction indicated, entry generator 8 and delivery generator 7 are wired in series with resistor 12 and ratio meter coil 14 respectively, while each such combination is in parallel with the load of generator 7 consisting of ratio meter coil 13 and resistor 11 in series terminating in the lead common to both generators.

The circuit is so designed as to operate with similar results with either direction of travel of the strip, providing a switch is used, as in Fig. 3, in which case a zero center indicator is preferred.

Assuming that generator 8, when on the entry side of the mill, is operating at a speed proportionally slower than generator 7 on the delivery side, it can therefore never produce a voltage sufficiently high to cause a current to flow through the load.

Hence all of the current generated by generator 7 passes through connectors 10 and coil 14, while part of it passes through the load consisting of coil 13 and resistor 11, the rest of it passes through resistor 12 and generator 8 in a reverse direction. Therefore the greater the departure from unity ratio the lesser becomes the voltage produced by generator 8 compared with that of generator 7, thus causing a greater proportion of current from generator 7 to be bypassed around coil 13.

As an example, with properly designed circuit and say a 5% increase in delivery speed over entry speed, generator 7 will deliver a total of 3.75 m. a. of which 2.5 m. a. will flow through coil 13, and 1.25 m. a. will pass through generator 8 in the reverse direction. It follows therefore that of course all of it or 3.75 m. a. will pass through coil #14.

Hence we see that full scale deflection will be obtained in an instrument which inherently will deflect full scale only, when one coil carries 50% more current that the other. Actually the network provides such distribution of current even though the generators themselves are operating at a 5% difference in speed.

In the above example, should the generator speeds in each case be decreased 50%, since their speed-voltage curves are straight lines, the voltages will be reduced proportionally as will the current flowing, and since the division of current through the coils is in the same proportion as before, the indication will be exactly the same, namely 5%.

In order to change the range of the indicator from 5% as above to some other value, say 1% or 10%, it is only necessary to change the resistance of resistor #11 to the correct value, which will therefore change the distribution of current through the network, so that a 50% difference in the coil currents will be obtained with a 1% or a 10% difference in generator speeds.

While I mention speed changes of 5% etc. above, the indicator scale itself may be calibrated directly in terms of percent reduction corresponding to the percent speed change.

I show in Fig. 2 a modified or simplified circuit network including ratio meter coil 14 in the main circuit and coil 13 and resistor 11 in a connecting circuit, as indicated.

However such is not the only alternative combination which may be used. For instance it would be possible to interchange coil 13 and resistor 12 and then recalculate the circuit constants to provide the desired proportioning of the current flow through the meter coils, i. e. one and one half times as much current in one coil as in the other.

In Fig. 3, it being assumed that the means, generators 7 and 8, for generating voltages proportional to the speeds of rotating members with interposition in the circuit of the ratio meter as in Fig. 1, with suitable current distributing network for reflecting a large difference in the current flowing through coils 13 and 14, the circulation may be reversed by interposition of a double pole double throw switch 24, which transposes coil 14 and resistor 12 into the network in opposite positions to those shown in Fig. 2, such being required in the case of a reversing mill.

Fig. 4 shows a portion of a tandem mill in which M18, M19, and M20 are the driven working rolls in each of three stands.

Tension roll 21 is associated with working rolls M18 but is driven solely by the friction of the sheet upon it. Likewise tension roll 22 is associated with working coils M19.

Consider now tachometer generators 8 and 7 respectively, disposed on the entry and delivery sides of the stand which houses working rolls M19. Since they are connected by the network herein described to a ratio meter by means of leads 9 and 10 in a manner identical with that shown in Fig. 1, the indication obtained will be the percent reduction obtained across the entire stand as pointed out above, and this will include the reduction caused by the draft of the rolls and the reduction caused by the tension applied by the successive stands.

Now consider in like manner a ratio meter and network connected by leads 9a and 10 to tachometer generators 8a and 7. Any reduction caused by tension applied by the succeeding rolls will be evidenced at the bite of working rolls M19, the action being similar to pulling the metal through a die.

Hence if no tension were applied the peripheral speeds of working rolls M19 and tension roll 22 would be equal. However, any reduction resulting from tension will cause an increase in the peripheral speed of tension roll 22 over that of working rolls M19, the amount of such increase being proportional to the reduction resulting from tension.

It may be explained further that in the cold reduction of metal there are two places where the radio meter and its associated network are particularly applicable, namely as percentage reduction indicators for each stand of a temper pass or skin pass mill, or across the entire mill, since mills of this type reduce the metal very slightly, i. e. usually under 6% total.

Also, as percentage reduction indicators to show the reduction being obtained as a result of the application of tension in a tandem mill where there are several stands in a row, and where the greater reduction is obtained due to the draft of the rolls, in addition to such reduction still further reduction is obtained resulting from the fact that considerable tension is applied to the sheet by the succeeding stands, tending to pull the sheet through the slower rolls.

Such reduction occurs at the bite of the slower rolls, hence it becomes possible to obtain a measure proportional to the elongation due to tension by comparing the speed of the working rolls to that of the tension roll on the delivery side of that particular stand. A ratio meter and network so connected therefore serves a dual purpose, in that it indicates the reduction resulting from the application of tension which is usually under ten percent, and also acts as a slip indicator. That is, if the working rolls start to slip, the delivered speed of that stand starts to approach that of the peripheral speed of the working rolls. This is an important function, since excessive slippage invariably results in breakage of the sheet, causing a shutdown of the mill.

While my invention is applicable to the important field of sheet or strip mill practice, it may be also applied to a great variety of applications and uses with properly applied network in connection with other voltage generating or supply means for indicating differences in potential.

Such other fields of use and application are available within the province of the present disclosure, and will readily suggest themselves to the electrical engineering fraternity, within the scope of the appended claims.

It will be obvious that the components of the network circuit of Fig. 2 may be either rearranged or changed or even partly eliminated to secure the same desired result.

The ratio meter coils themselves may be relocated physically in different paths of the network to accomplish the same result. Also the resistors 11 or 12 may be either partially or wholly eliminated, and substituted if desired, by the normal proportioned resistance of the circuit conductors themselves.

What I claim is:

1. A network for the purposes described consisting of two voltage sources, one side of each being at a common potential, one source being in series with one ratio meter coil and the other in series with a resistor, between the junction of which and the point of common potential is embodied the connection, in series, of the other ratio meter coil and a second resistor.

2. A network for the purposes described consisting of two voltage sources, one side of each being at a common potential, one source being in series with one ratio meter coil and the other in series with a resistor, between the junction of which and a point of common potential is embodied the connection, in series, of the other ratio meter coil, and a second resistor of the variable type which serves to change the calibration, or scale range, of the ratio meter.

THOMAS A. KENNY.